US012235015B2

(12) United States Patent
Chao

(10) Patent No.: US 12,235,015 B2
(45) Date of Patent: Feb. 25, 2025

(54) LASTING EFFECT ESSENTIAL OIL SUPPLY AROMATHERAPY HUMIDIFIER

(71) Applicant: Majestic-M&A International Co., Ltd., Taipei (TW)

(72) Inventor: Hsuan-Yu Chao, Taipei (TW)

(73) Assignee: Majestic-M&A International Co., Ltd., Taipei (TW)

( * ) Notice: Subject to any disclaimer, the term of this patent is extended or adjusted under 35 U.S.C. 154(b) by 390 days.

(21) Appl. No.: 17/686,438

(22) Filed: Mar. 4, 2022

(65) Prior Publication Data

US 2023/0280054 A1 Sep. 7, 2023

(51) Int. Cl.

| | |
|---|---|
| ***B01F 23/21*** | (2022.01) |
| ***B01F 23/213*** | (2022.01) |
| ***F24F 6/14*** | (2006.01) |
| ***F24F 11/30*** | (2018.01) |
| *F24F 6/00* | (2006.01) |

(52) U.S. Cl.

CPC ............ *F24F 6/14* (2013.01); *B01F 23/2133* (2022.01); *F24F 11/30* (2018.01); *F24F 2006/008* (2013.01); *F24F 2221/02* (2013.01)

(58) Field of Classification Search

CPC .......... F24F 6/14; F24F 11/30; B01F 23/2133

See application file for complete search history.

(56) References Cited

FOREIGN PATENT DOCUMENTS

CN 215260270 U * 12/2021

* cited by examiner

*Primary Examiner* — Robert A Hopkins

(57) ABSTRACT

A lasting effect essential oil supply aromatherapy humidifier comprises: a water storage bucket is located the top of a seat, the inner bottom of the bucket is provided with an atomizer, an inner cover shell is covered on the water storage bucket, and the outermost layer is covered with an outer cover shell. The essential oil releaser is located on the water storage bucket, and the essential oil releaser has a placed seat, and a threaded connection port upwards on one side of for supplying an opening of the essential oil bottle to be butted, and another side is located with a control amount release opening which is sunk low into the water storage bucket. The essential oil can be slowly released into the water storage bucket for an extended period for perfume fusion, the application can produce a consistent and elegant light fragrance spray, which is released into the air. The present invention allows users to conveniently add essential oils without frequently opening the aromatherapy humidifier, and at the same time, which can prolong the use time of the aromatherapy, and obtain the effects of refreshing, reinvigorating, and physical and mental comfort.

3 Claims, 6 Drawing Sheets

LASTING EFFECT ESSENTIAL OIL SUPPLY AROMATHERAPY HUMIDIFIER

BACKGROUND OF THE INVENTION

Field of the Invention

This present invention relates to the technology field of an aromatherapy humidifier, in particular to a lasting effect essential oil supply aromatherapy humidifier.

The Prior Arts

In recent years, the medical and beauty industries have developed rapidly, and human beings have paid increased attention to beauty maintenance and medical care. For example, at present, an ultrasonic water oxygen machines, a beauty care machines, the water mist incense humidifiers, the essential oil diffusers, etc., have been widely used in beauty salons and general families Most incense humidifiers are achieved by the principle of ultrasonic atomization. Before application, the essential oil must be dropped into the water storage tank, and then the water in the water storage tank and the essential oil will be hit by high-frequency bubbles through the ultrasonic atomizer. The aromatherapy mist is formed in the cavity of the aromatherapy machine, and the essential oil mist is brought out of the machines body through the high-speed airflow of the fan, so as to achieve the function of incense diffusing and humidifying the surrounding environment.

In order to avoid the trouble that the existing incense humidifier needs to repeatedly open the upper cover to add essential oil after continuous use for a period, the inventor proposed an improvement concept before, and tried to insert the essential oil bottle upside down directly into the aromatherapy humidifier. In the device, the oil drip holes, and air holes set on the built-in dripper of the general essential oil bottle are used, so that the essential oil of the essential oil bottle can be automatically dripped into the water storage tank of the aromatherapy humidifier, and the ultrasonic vibration and volatilization are carried out through the atomizer. Then blow the incense out with a fan, so that the incense can be continuously dispersed into the outside air.

But can produce following shortcoming in practical application: 1. because its drip hole design of the built-in dripper of the general essential oil bottle is fixed, the drip volume and drip speed of the essential oil cannot be controlled effectively, once the essential oil bottle is inverted, the essential oil run out amazingly fast after dripping, and cannot achieve long-term use. 2. Because the essential oil particles instilled into the water storage tank are large and continuously uncontrolled, it is easy to cause the incense emitted by the more essential oil content in the water in the initial stage of the incense humidifier. In the later stage, the essential oil content in the humidifier water will be reduced, and the incense effect emitted will be significantly lighter, and the intensity of the fragrance before and after cannot be consistent. There is a need for improvement.

SUMMARY OF THE INVENTION

In view of foregoing, the main purpose of the present invention, in providing a lasting effect essential oil supply aromatherapy humidifier, comprises:

A water storage bucket is located the top of a seat, the inner bottom of the bucket is provided with an atomizer, an inner cover shell is covered on the water storage bucket, and the outermost layer is covered with an outer cover shell, and an air flow channel is formed inside the overall combination. There is a mist outlet on the inner cover shell, the mist outlet corresponds directly to the air outlet of the cover shell. And an air inlet, a micro fan, and a control board are arranged in the lower compartment of the seat. The control board is electrically connected with the atomizer, the micro fan, and the control button of outer peripherals, which are characterized by:

The essential oil releaser is located on the water storage bucket, and the essential oil releaser has a placed seat of which is a pipe in the middle, and a threaded connection port upwards on one side of the pipe for supplying an opening of the essential oil bottle to be butted, and another side of the pipe is located with a control amount release opening which is sunk low into the water storage bucket. The essential oil can be slowly released into the water storage bucket for an extended period for perfume fusion, and the atomizer and the micro fan are blown out to produce a long-lasting incense spray and released into the air.

Overall effective combination, utilize this essential oil releaser to be available to be upside-down combined with an essential oil bottle, so that essential oil can be slowly released into the described water storage bucket for long-term control at intervals for a period of time to dissolve in the perfume, collocated with this atomize and the micro fan to produce a consistent and elegant fragrance spray, which is blown out, then into the air. The present invention allows users to conveniently add essential oils without frequently opening the aromatherapy humidifier, and at the same time, which can prolong the use time of the aromatherapy, and obtain the effects of refreshing, reinvigorating, and physical and mental comfort.

EMBODIMENT

Figure 1:
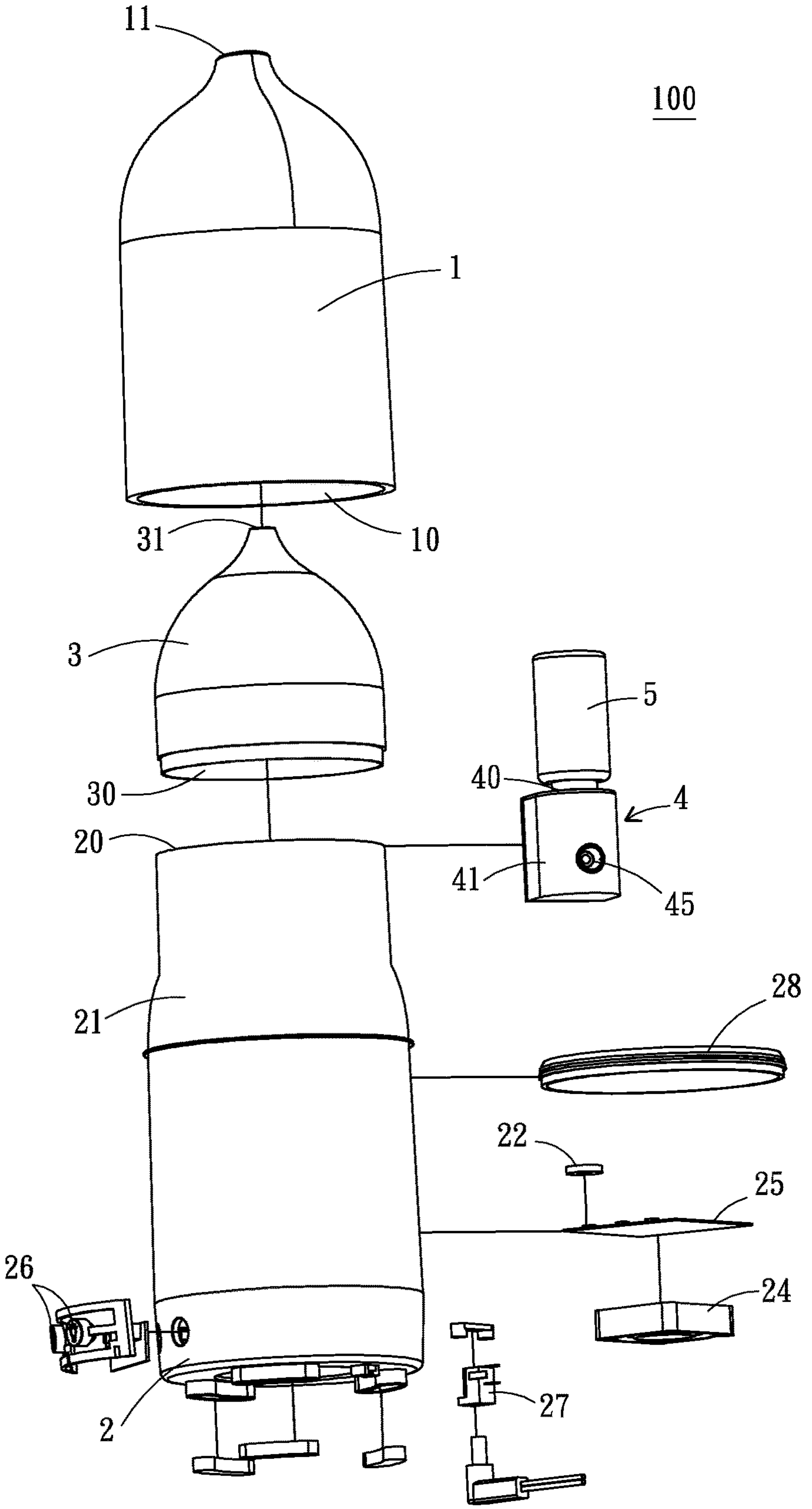
FIG. 1 is a three-dimensional schematic of the present invention.

In order to facilitate the understanding of the content of this creation, and achieve the effect, cooperate with the schematic to list specific embodiments, detailed as follows: please refer to FIG. 1 to FIG. 4. The present invention is configured a lasting effect essential oil supply aromatherapy humidifier 100, mainly comprising: an outer cover shell 1, a seat 2, an inner cover shell 3, and an essential oil releaser 4.

Wherein the outer cover shell 1 is located on a top layer, and an opening 10 is under the outer cover shell 1 which is provided to cover the seat 2 and the inner cover body 3, an air outlet 11 is located on the outer cover shell 1 for blowing out internal gas.

The seat 2 is located on a bottom layer, a water storage bucket 21 is located on the seat 2, an atomizer 22 is located on the bottom of the water storage bucket 21, and a lower compartment is located in the seat, where are an air inlet 23, a micro fan 24 and a control board 25 which is electrically connected to the atomizer 22, and the micro fan 24, wherein the control board 25 is externally connected to a control button 26 and a DC socket 27 for external power supply; and a waterproof ring 28 is located on an outer side of the seat 2 to be tightly connected with the opening 10 of the outer cover shell 1 to prevent water leakage;

the inner cover shell 3 is located in a middle layer in a shape of a reverse bucket, and a set of combined opening 30 is combined to cover the water storage bucket opening 20 of the seat 2, a mist outlet 31 is located on an upper position of the inner cover shell 3 which corresponds directly to the air outlet 11 of the cover shell 1, and a water baffle 32 is located in an inner passage interval of the mist outlet 31; and The essential oil releaser 4 is located on the water storage bucket 21 of the seat 2, and the essential oil releaser 4 has a placed seat 41 of which is a pipe in the middle, and a threaded connection port 40 upwards on one side of the pipe for supplying an opening of the essential oil bottle 5 to be butted, and another side of the pipe is located with a control amount release opening 45 which is sunk low into the water storage bucket 21, and the back of the placing base 41 is combined with the inner wall of the water storage bucket 21;

The preferred embodiment, wherein the threaded connection port 40 of the placed seat 41 is composed of a front connection port 401, an inside thread 402 and a bottom groove 403 for disposing a rubber ring 404, so as to form a general joint for butt joint of commercially available essential oil bottle 5;

The preferred embodiment, wherein the control amount release opening 45 located on the placed seat 41 which is an electronically controlled spray module, the electronically controlled spray module is composed of an atomizing sheet 451, an oil pad 452 and a nozzle cover 453 on the outer expansion ring of the outlet, the nozzle cover 453 is a convex hole sheet, and the atomizing sheet 451 is electrically connected to the control board 25.

As shown in FIG. 1 to FIG. 4, an airflow channel is formed in the aromatherapy humidifier 100 as a whole in this creation, and a water level sensing element not shown in the figure can be further provided on the inner wall of the water storage bucket 21, used to detect and display the water level. If the water level is lower than a set value, the water level means that water needs to be added to prevent the machine from drying up and causing damage due to continuous operation. During application, at first fill enough water in the water storage bucket 21, and the essential oil bottle 5 is installed upside down on the essential oil releaser 4, so that the essential oil is released through the control amount release opening 45, and a small amount of the essential oil is released at regular intervals. It is sprayed into the water storage bucket 21, so that the essential oil can be released into the water storage bucket 21 for a long period of time to be released into the water storage bucket 21 for perfume fusion. When the control button 26 is pressed, the aromatherapy humidifier 100 is activated, and the atomizer 22 atomizes the perfume in the water storage cylinder 21, and the atomized mist is first blocked by the water baffle 32 of the inner cover shell 3. The mist of large particles is removed, so that the mist of small particles is the last entering the mist outlet 31, so as to avoid the direct spraying of the mist of large particles due to the direct connection of the mist outlet, resulting in poor atomization effect, and it is easy to spray wet and cause water accumulation near the humidifier.

Through the effective design of the essential oil releaser 4 of the present invention, the essential oil in the essential oil bottle 5 can be slowly released into the water storage bucket 21, and ultrasonic waves are generated by the vibration of the atomizer 22 in the water storage bucket 21, so that the essential oil molecules placed in the water storage bucket 21 are volatilized in the air by ultrasonic vibration, and then the micro fan 24 is used to perform the function of blowing air, and the volatilized essential oil molecules are removed from the aromatherapy humidifier 100, blown upwards into the outside air.

Compared with the prior art, the novel aromatherapy humidifier 100 can effectively control and reduce the amount of essential oil released and prolong the use time of the perfume, so that the user does not need to open the aromatherapy humidifier 100 frequently to add essential oils. The convenience of adding essential oils can also allow users to continuously smell the perfume with uniform intensity and consistent aroma concentration before and after, so as to achieve the effect of refreshing, reinvigorating, and physical and mental comfort, therefore, enhance and improve the effect of purifying the mind and soothing the heart.

Figure 4:
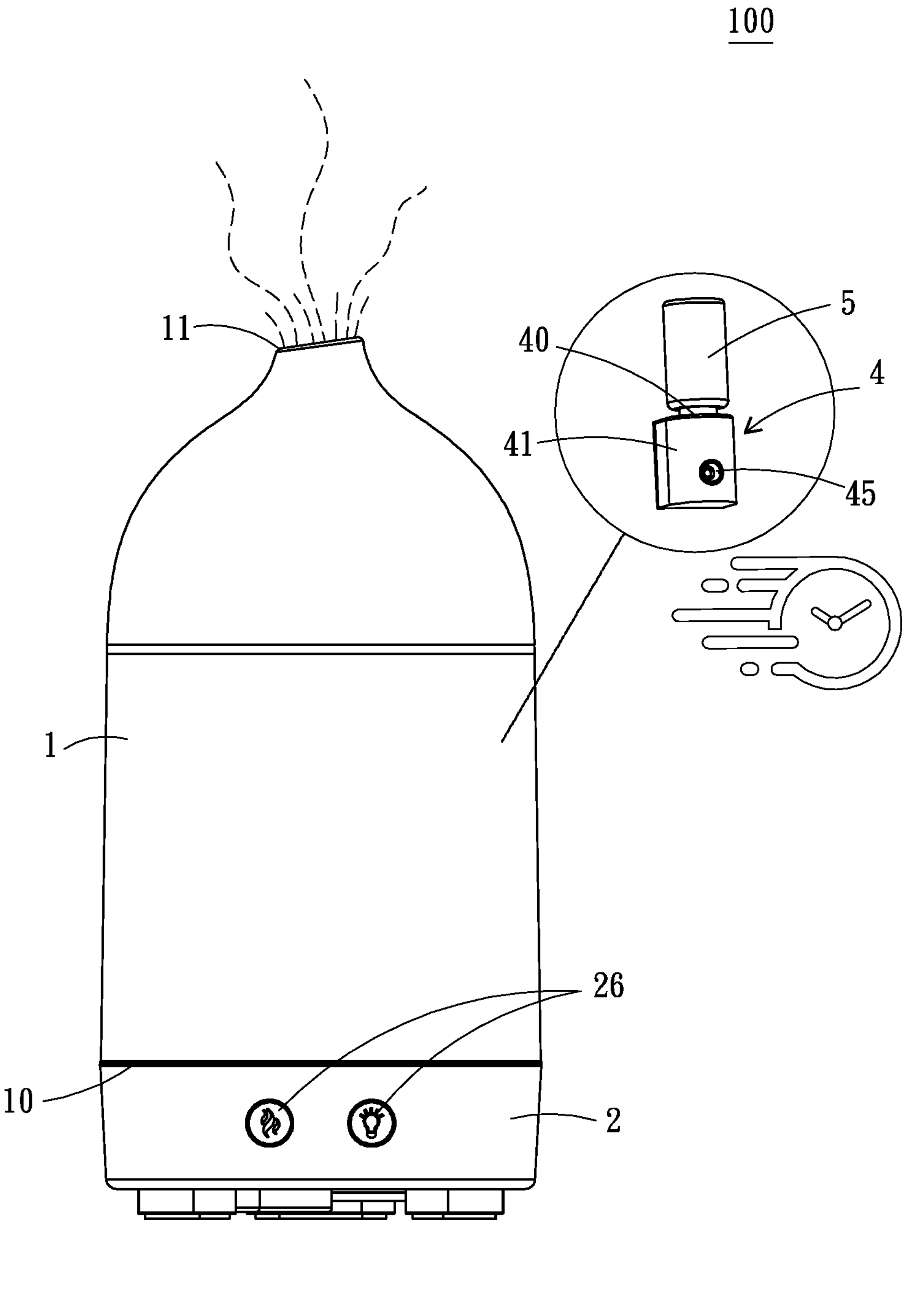
FIG. 4 is the application schematic diagram of the of the present invention.
Figure 5:
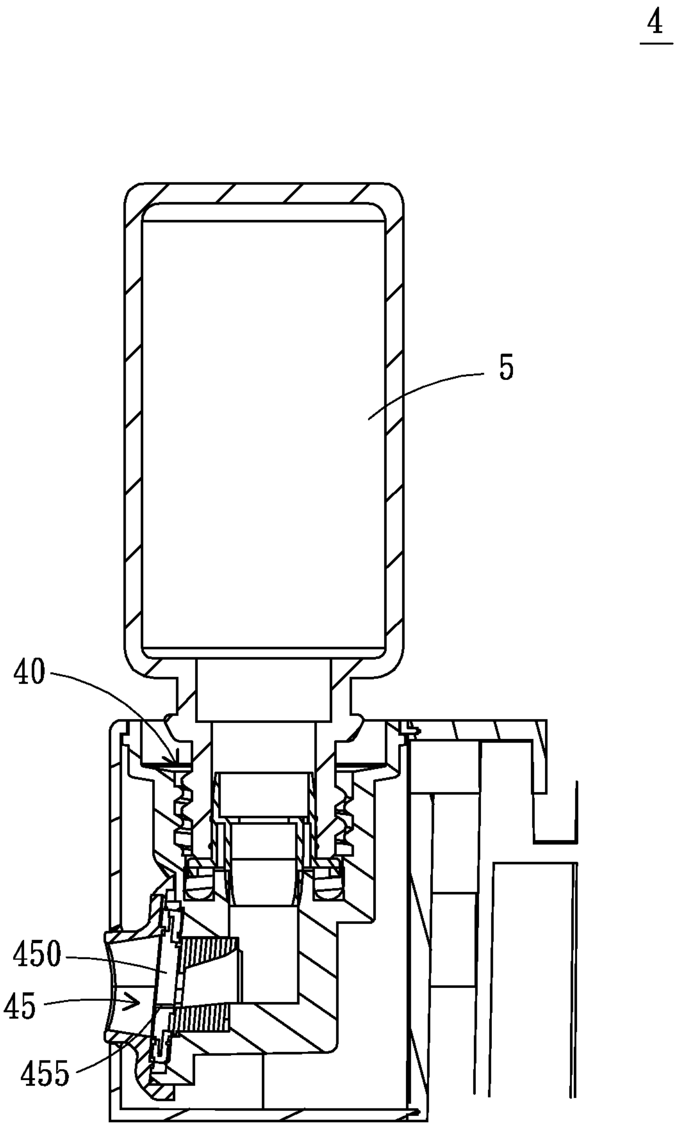
FIG. 5 is a partially enlarged cross-sectional view of an essential oil releaser according to another embodiment of the present invention.

Of course, please refer to FIG. 4, and FIG. 5, The present invention, the control amount release opening 45 located on the placed seat 41, the control amount release opening 45 is formed a structure that an outer expansion ring of the outlet combined with a micro hole cap 450, and the drip hole 455 located on the control amount release opening 45 has a diameter ranging from 0.1 mm to 0.6 mm. In this way, the dripping method is adopted, but it is not limited to this, and the same effect of prolonging the use of essential oils can also be achieved.

Figure 2:
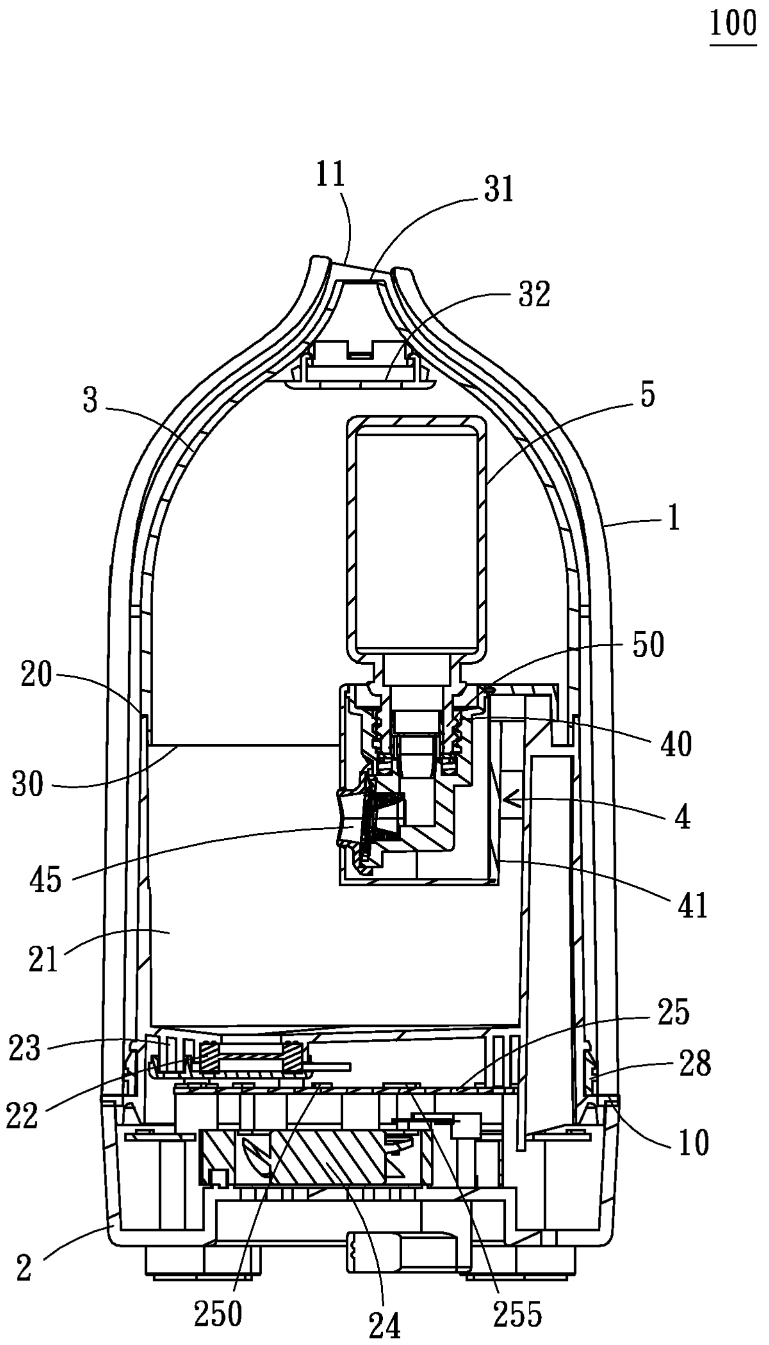
FIG. 2 is a sectional view schematic of the present invention.
Figure 3:
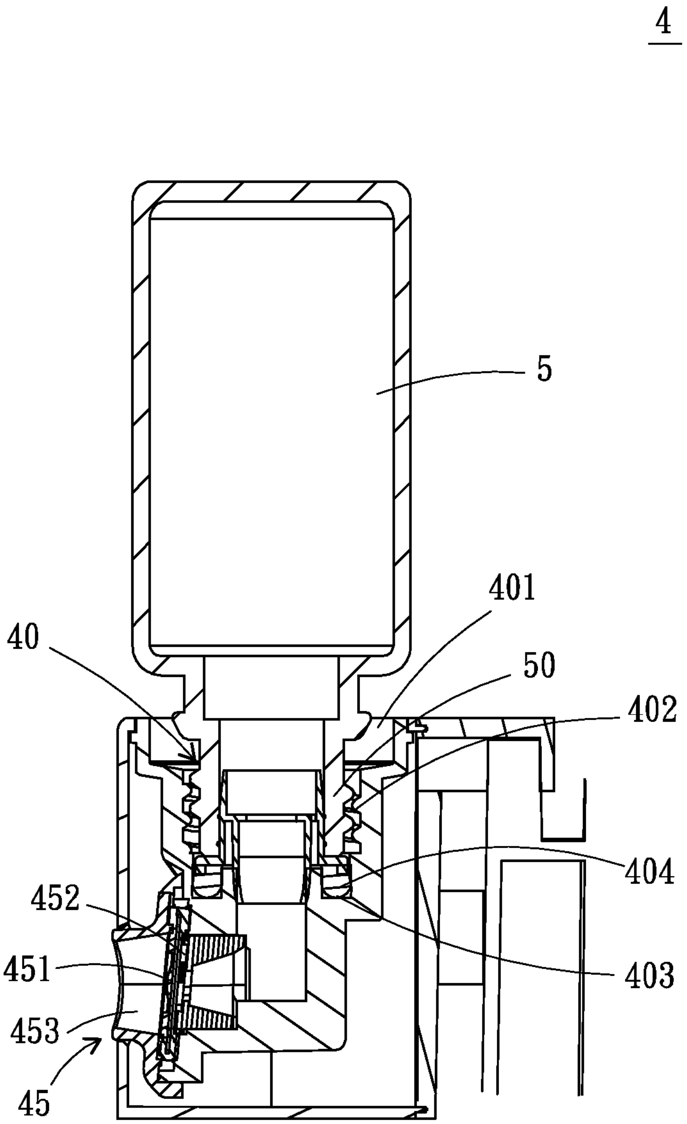
FIG. 3 is a partially enlarged cross-sectional view of the essential oil releaser of the present invention.
Figure 6:
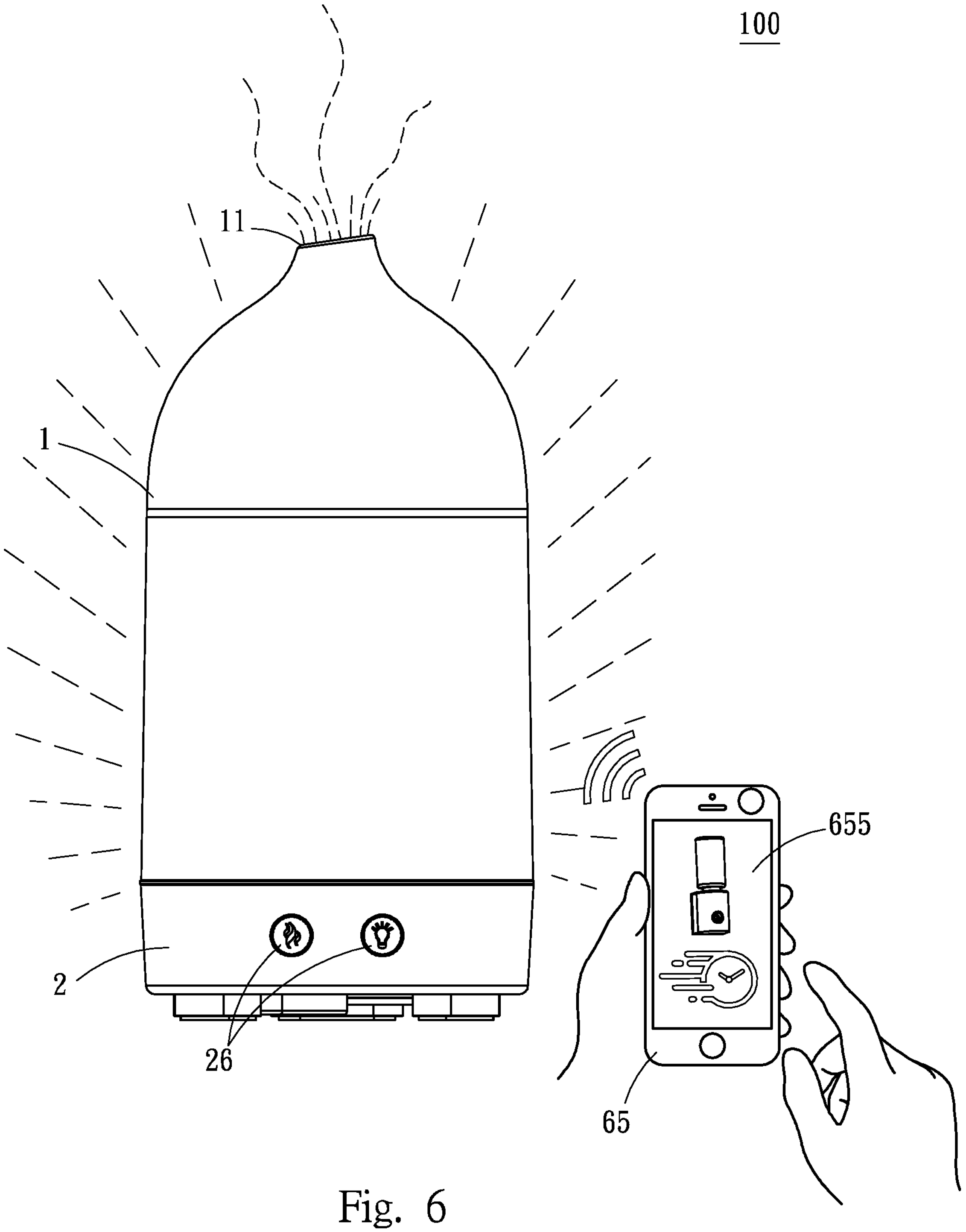
FIG. 6 is an example diagram of an application of the present invention controlled by an APP.

In addition, please refer to FIG. 2 and FIG. 6, the present invention is preferably implemented in which an LED lamp 250, the cover shell 1, the water storage bucket 21, and the inner cover shell 3 is made of light-transmitting materials to provide luminous penetrating color, which are located on the control board 25, and an IoT (Internet of Things) Module 255 is also located on the control board 25, and an electronic device 65 with an APP application 655 is furthermore provided to a timing switch to operate/select/control/set the flow of essential oil, and release time of essential oil.

The function of the present utility model is further strengthened and has the following advantages: 1. the automatic addition of essential oils can be realized, and the outer cover need not be opened frequently; 2. the amount of essential oils added is accurately and continuously quantitatively controlled, so that the fragrance is consistent before and after the long-lasting effect of spreading; 3. When applied, it can emit light to produce the color light effect of fragrance mist; 4. The whole device can be intelligently controlled by APP, providing timing switch operation/selection/control to set the flow rate of essential oil and the length of release time, which effectively solves the cumbersome manual addition operation in the prior art.

To sum up, the present invention is novel and practical and fully meets the requirements of the patent, therefore, an invention patent application is filed. However, the above are only the preferred embodiments of the present invention, and should not limit the scope of the implementation of the present invention; therefore, any equivalent changes and modifications made according to the scope of the patent application for the present invention and the content of the present invention description should be are covered by the present invention patent.

What is claimed is:

1. A lasting effect essential oil supply aromatherapy humidifier, mainly comprising: an outer cover shell, a seat, an inner cover shell, and an essential oil releaser; wherein the outer cover shell is located on a top layer, and an opening is under the outer cover shell which is provided to cover the seat and the inner cover body, an air outlet is located on the outer cover shell for blowing out internal gas;

the seat is located on a bottom layer, a water storage bucket is located on the seat, an atomizer is located on the bottom of the water storage bucket, and a lower compartment is located in the seat, where are an air inlet, a micro fan and a control board which is electrically connected to the atomizer, and the micro fan, wherein the control board is externally connected to a control button and a DC socket for external power supply; and a waterproof ring is located on an outer side of the seat to be tightly connected with the opening of the outer cover shell to prevent water leakage;

the inner cover shell is located in a middle layer in a shape of a reverse bucket, and an opening of the inner cover shell covers the water storage bucket opening of the seat, a mist outlet is located on an upper position of the inner cover shell which corresponds directly to the air outlet of the outer cover shell, and a water baffle is located in an inner passage of the mist outlet; and the essential oil releaser is located on the water storage bucket of the seat, and the essential oil releaser has a placed seat of which is a pipe in the middle, and a threaded connection port upwards on one side of the pipe for supplying an opening of an essential oil bottle to be butted, and another side of the pipe is located with a control amount release opening which is sunk low into the water storage bucket, and the back of the placed seat is combined with the inner wall of the water storage bucket;

wherein the threaded connection port of the placed seat is composed of a front connection port, an inside thread, and a bottom groove for disposing a rubber ring, so as to form a general joint for butt joint of the essential oil bottle;

wherein an LED lamp, the outer cover shell, the water storage bucket, and the inner cover shell are made of light-transmitting materials to provide luminous penetrating color, which are located on the control board, and an loT Module is located on the control board, and an electronic device with an APP application is provided to a timing switch including at least one of operating, selecting, controlling, or setting the flow of essential oil, and release time of essential oil.

2. The lasting effect essential oil supply aromatherapy humidifier as claimed in claim 1, wherein the control amount release opening located on the placed seat which is an electronically controlled spray module, the electronically controlled spray module is composed of an atomizing sheet, an oil pad and a nozzle cover, wherein the atomizing sheet, the oil pad, and the nozzle cover are placed over a discharge opening of the essential oil releaser, the nozzle cover is a convex hole sheet, and the atomizing sheet is electrically connected to the control board.

3. The lasting effect essential oil supply aromatherapy humidifier as claimed in claim 1, wherein the control amount release opening is formed of a micro hole cap and a drip hole, the drip hole having a diameter ranging from 0.1 mm to 0.6 mm, and the control amount release opening placed over a discharge opening of the essential oil releaser.

* * * * *